United States Patent [19]

Hedges

[11] 3,819,862

[45] June 25, 1974

[54] COMMUNICATION SYSTEM WITH PORTABLE UNITS CONNECTED THROUGH A COMMUNICATION CHANNEL TO A COMPUTER FOR APPLYING INFORMATION THERETO

[75] Inventor: Walter Paul Hedges, Phoenix, Ariz.

[73] Assignee: Motorola, Inc., Franklin Park, Ill.

[22] Filed: Jan. 10, 1972

[21] Appl. No.: 216,678

[52] U.S. Cl. ............... 179/2 A, 179/2 DP, 340/153, 340/312, 340/286

[51] Int. Cl. .......................................... H04m 11/00

[58] Field of Search. 179/2 DP, 15 AL, 2 A, 18 BF; 340/311, 312, 153, 286; 178/66, 69.5 R; 325/320, 30

[56] References Cited

UNITED STATES PATENTS

| | | | |
|---|---|---|---|
| 3,263,185 | 7/1966 | Lender | 325/30 |
| 3,516,062 | 6/1970 | Spraker | 179/2 DP |
| 3,588,365 | 6/1971 | McNeilly et al. | 179/15 AL |
| 3,597,539 | 8/1971 | Clark | 178/69.5 R |
| 3,675,204 | 7/1972 | Miehle et al. | 340/153 |
| 3,684,832 | 8/1972 | Marguth | 179/2 DP |

*Primary Examiner*—Kathleen H. Claffy
*Assistant Examiner*—Alan Faber
*Attorney, Agent, or Firm*—Vincent J. Rauner; Kenneth R. Stevens

[57] ABSTRACT

System for indicating the condition of hotel rooms or the like having a computer coupled to a memory and to display devices, with a communication channel extending from the computer to remote points, such as individual hotel rooms. A portable unit is carried by a maid or other personnel and is adapted to be coupled to a communication channel which may be present for another purpose. For example, the communication channel may be the telephone lines which provide telephone service to the rooms, a television antenna cable, or any other communication channel which is available. The portable unit includes a circuit for transmitting and receiving signals, and switches coupled thereto. When used with a telephone line, the portable units can be coupled thereto through an acoustic coupler, or a receptacle can be provided for the unit which is directly wired to the line. The portable unit or the receptacle can also include a circuit which is uniquely wired or switched for each room, so that a signal can be sent on the line which identifies the room and the particular portable unit, and which provides information representing the operation of the switches of the portable unit. The portable unit may include batteries for energization of the circuit therein. The information supplied on the communications line is coupled to the computer and stored in the memory thereof, and selectively read out on a visible display and/or printer as desired.

28 Claims, 11 Drawing Figures

COMMUNICATION SYSTEM WITH PORTABLE UNITS CONNECTED THROUGH A COMMUNICATION CHANNEL TO A COMPUTER FOR APPLYING INFORMATION THERETO

BACKGROUND OF THE INVENTION

This invention relates generally to a system for providing information to a computer so that the information can be stored in the memory and/or displayed, and in particular to a system including a portable unit adapted to be carried by a person and which is adapted to be coupled to a communication channel at a plurality of different points for applying signals to the computer.

It is desired in many applications to keep track of the condition of a plurality of physically spaced items, such as the rooms in a hotel or a motel. The room clerk needs to know which rooms are occupied, which are vacant and which are in condition to be rented. The housekeeper needs to know which rooms are vacant and which rooms require attention. The housekeeper also needs to keep track of maids and other personnel and know when they are in a particular room, and when they have completed their work in each room. Other maintenance personnel may also need to service the rooms, and it is desired that supervisory personnel know where the maintenance personnel are and when the maintenance in a particular room is completed.

Systems have been used wherein communication channels are provided in hotels and/or motels over which information can be communicated to a central point. These systems have required a separate communication channel, not used for other purposes, and this has resulted in a substantial cost in providing the communications systems. The systems which are known have provided only very elementary information, such as that a person is in the room and that the cleaning of the room is completed, but have not provided sufficient information to identify the person. The prior systems have provided indications at visible display units which are utilized only for the room condition indication. These are objectionable because substantial space is required for the display, and the cost is very high for the information furnished.

Although hotels and motels have utilized computers in connection with the making of reservations and the handling of billing, there has been no access to such computers from the rooms, whereby a maid or other person can furnish information as to the condition of the room to the computer. Also, information has not been supplied to these computers as to the operating and maintenance personnel of the hotel, to keep track of their whereabouts and progress.

SUMMARY OF THE INVENTION

It is an object of the present invention to provide a system for communicating between a plurality of different points, such as the rooms in a hotel, and a computer by use of a communication channel which is provided for another purpose.

A further object of the invention is to provide a communication system including portable units having switches and electronic circuitry for applying from different rooms to a communication channel, signals which identify the particular room, the particular portable unit and the operation of the switches, and which signals do not interfere with other use of the channel.

Another object is to provide a system for communicating to a central computer from rooms in which telephone service is provided, by use of portable electronic units carried by personnel, with the portable units being coupled to the telephone equipment in the rooms and the computer being coupled to the telephone switching equipment.

A still further object of the invention is to provide a system for applying signals from points in a building to a computer at a central point, by acoustically coupling from portable units to the telephones at the remote points.

Still another object of the invention is to provide a system for applying signals from rooms in a building, such as a hotel, to a computer at a central point over telephone lines provided in the building, which include an interface circuit for connecting the unit in a room to the telephone line for applying signals thereto which do not interfere with the normal use of the telephone lines.

A further object of the invention is to provide a communication system including portable electronic units and receptacles for receiving the same at various points within a building wherein the portable units and the receptacles each include circuitry which cooperates when the units are interconnected to apply signals to a computer over a communication channel connecting the receptacles to the computer, for receiving signals from the computer, and for applying signals to the computer for storage and/or display.

The system of the invention includes portable units which are carried by maids or other personnel who provide service operations in the rooms of a hotel, for example. Receptacles can be provided in the rooms which are connected to a communication channel, such as the telephone lines which extend into the rooms, with mating connectors on the portable unit and the receptacle to provide electrical connections therebetween. Alternatively, the portable units can include equipment for acoustically coupling to the telephone sets in the rooms. A computer is connected through a coupling unit to the telephone line or other communication channel for communicating with the portable unit, with control, memory and read out equipment, such as a cathode ray tube display or a printer, being coupled to the computer.

The portable unit includes a transmitter and a receiver for communicating over the communication channel to the computer. The computer applies signals to the receiver to indicate that the computer is ready to receive information, or to furnish other information to the portable unit. The portable unit may also include a dialer or other calling device which operates in response to actuation of a switch on the portable unit to indicate to the computer that the unit desires to send information thereto. The information from the transmitter can be stored in the computer and/or displayed or used in any manner thereby.

The portable unit also includes a coding circuit coupled to the transmitter to identify the particular portable unit, and has switches to provide additional information selected by the person carrying the unit. A coding circuit is selectively coupled to the transmitter to identify the particular room involved. The portable unit further transmits a check word which is used to determine if a proper signal is received. In the event that a proper signal is not received, the computer sends a signal to the portable unit to request a repeat of the signal, and if after a given number of repeated operations a proper signal is not received, the computer will transmit a signal to the portable unit indicating that the information is rejected, which causes energization of a lamp on the portable unit. Other information applied from the computer to the portable units can be used to operate other lamps thereon.

DETAILED DESCRIPTION

Figures 1, 2, 3:
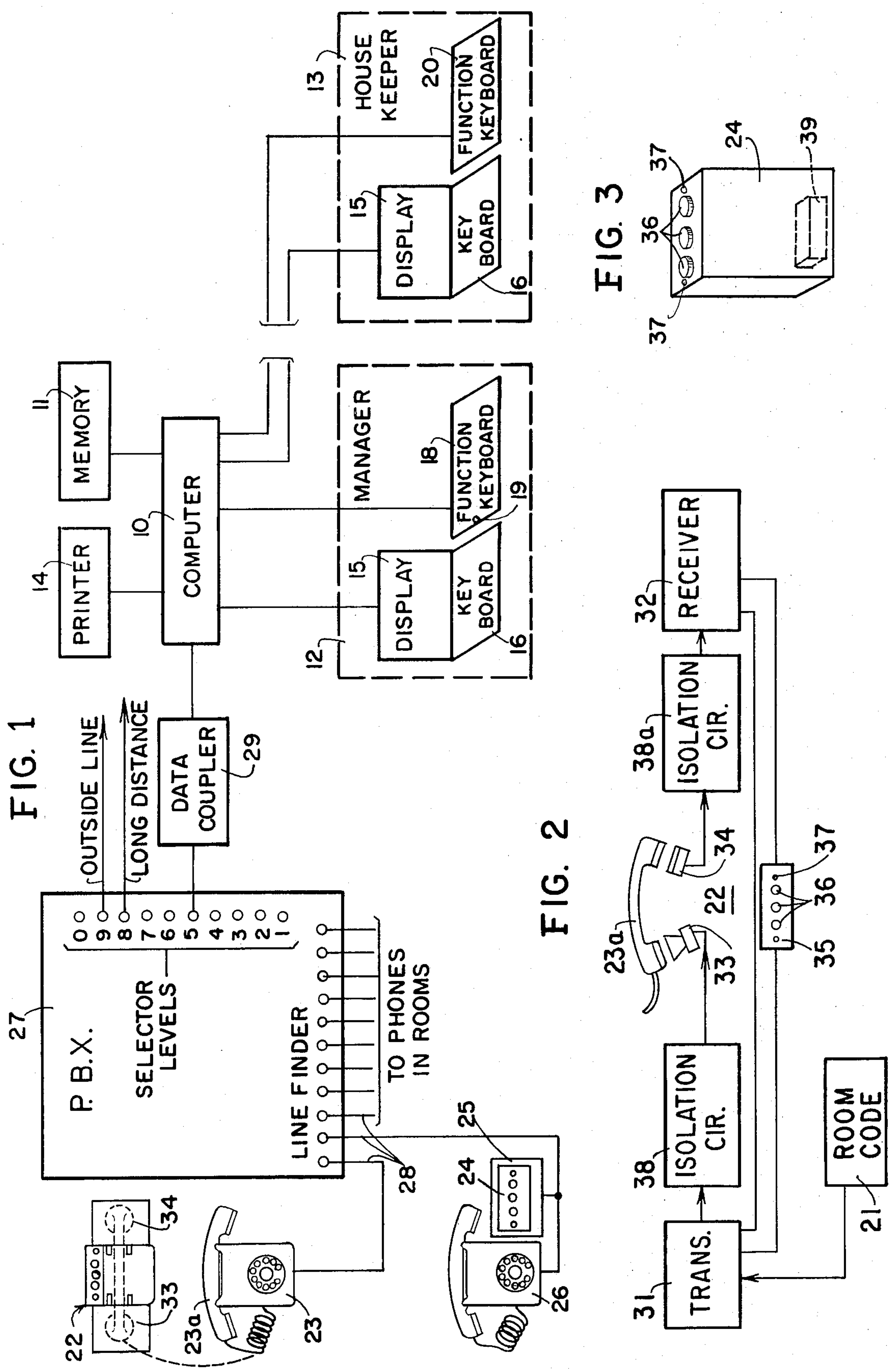
FIG. 1 is a block diagram of the system of the invention with signals being applied over telephone lines.
FIG. 2 illustrates one form of portable unit used in the system of FIG. 1.
FIG. 3 is a perspective view of the second form of portable unit of the system of FIG. 1.

In FIG. 1, the system for use in a hotel or motel is shown in block diagram form wherein the computer 10 is coupled to control and display units 12 and 13. Unit 12 may be in the manager's office, and unit 13 in the housekeeper's office. Also connected to the computer 10 is memory apparatus 11 which may include one or more memory devices for storing information and providing the same to the computer. A printer 14 is also connected to the computer for printing out information such as lists of rooms available, or for providing billing.

The unit 12 includes a display device 15, such as a cathode ray tube, and a keyboard 16 for controlling the display of the information. A further keyboard 18, designated a function keyboard, is coupled to the computer to control the basic operation thereof. This may include a lock 19 so that the functions cannot be controlled by unauthorized personnel. This may be used, for example, to set the rates for the rooms in the hotel so that the computer can automatically provide the billing. The housekeeper control unit 13 may also include a display device 15, keyboard 16 for controlling the information displayed, and function keyboard 20. The function keyboard 20 may be connected to provide only some of the functions possible through the manager's keyboard 18, and may control additional functions. Preferably, the manager's control unit 12 will provide a fast display of information and will be located close to the computer so that a high quality communication channel can be provided therebetween at low cost. The housekeeper's control may be at a greater distance from the computer, as it will not normally be necessary to provide a fast display.

The computer and elements coupled thereto which have been described can be provided by known equipment, with the complexity varying through a wide range depending upon the uses to be made of the system. A very simple computer can be used if it is desired to provide only the communication systems and functions which will be described.

For communications from a plurality of points in a building, such as the rooms in a hotel, signals can be coupled from portable units to the computer through the telephone equipment. In the system of FIG. 1, a portable unit 22 is shown adapted for acoustic coupling to the handset 23*a* of telephone 23. A second portable unit 24 is provided which is received in receptacle 25 connected to the telephone line adjacent telephone 26. A PBX switchboard 27 is shown having lines 28 connected to the telephones 23 and 26, and other lines extending to telephones in other rooms, which are not shown. The switchboard has selector levels connected to outside lines and to a long distance operator to permit access to such facilities from the telephones. The computer 10 is connected to one selector level of the PBX switchboard 27 by data coupler 29. The switchboard and data coupler can be standard components provided by the telephone company.

The portable unit 22 of the system of FIG. 1 is illustrated in FIG. 2. This includes transmitter 31 and receiver 32, which will be described in more detail. The transmitter 31 is coupled through isolation circuit 38 to transducer 33 which translates electrical signals of audio frequency to audible signals. Similarly, the receiver 32 is coupled through isolation circuit 38*a* to transducer 34 which receives audible signals from the receiver of the handset and translates the same to electrical signals. The transducers 33 and 34 and isolation circuits 38 and 38*a* of the portable unit form an acoustical coupler, as is known in the art. The portable unit 22 can be placed adjacent the telephone 23, with the handset 23*a* thereof placed on the acoustic coupler. The microphone of the handset is positioned adjacent transducer 33, and the receiver of the handset is positioned adjacent transducer 34. No direct connection to the telephone line is required, and audio frequency signals are coupled acoustically to the microphone and from the receiver of the telephone handset.

A control panel 35 of the portable unit 22 is coupled to the transmitter 31 and receiver 32, and includes operating switches 36 and indicator lights 37. A room code device 21 is selectively coupled to the transmitter 31 to apply thereto a room identifying code. This may be provided by thumb wheel switches on the portable unit for setting a room number code, or by a card including diodes, which is provided in the room, as will be described in connection with FIG. 8. The receiver 32 is coupled to the transmitter 31 for controlling the same, as will be explained.

The portable unit 24 is illustrated in FIG. 3, and includes a transmitter and a receiver which may be similar to the transmitter 31 and receiver 32 of the unit of FIG. 1. The unit 24 may also include a dialer, as will be described. The control panel 35 is provided on the top of the unit 24 and includes pushbutton switches 36 and indicator lights 37, as in FIG. 2. The transmitter, receiver and dialer of portable unit 24 are connected to the telephone line through an interface circuit to be described. Connections are made through connector 39 on the unit 24, which mates with connector 40 of a receptacle 25, which is connected to the telephone line.

The portable units 22 and 24 in the system of FIG. 1 illustrate two types of portable units which can be used in systems in accordance with the invention. In any installation, portable units of only one type will normally be used. The portable units 22 and 24 may be completely self-contained and include electronic circuitry and batteries for energizing the same. When portable units as illustrated by unit 24 are used, receptacles as indicated at 25 will be provided in each of the rooms from which it is desired to communicate. The information to be applied to the telephone lines can be provided by audio frequency signals having characteristics such that they will not interfere with other signals present on the telephone lines.

When the system of FIg. 1 is used with portable units 22 as shown in FIG. 2, the person carrying a portable unit will place it adjacent the telephone 23 and position the telephone handset 23*a* on the acoustic coupler so that the microphone and receiver of the handset are adjacent the transducers 33 and 34 of the acoustic coupler. One or more of the switches 36 will be operated corresponding to the information to be transmitted. Then the dial on the telephone set 23 will be operated to cause the PBX switchboard 27 to connect the data coupler 29 and computer 10 to the calling telephone line. In the system as shown, the data coupler is coupled to selector level 5, so that the number 5 would be dialed to connect the computer. The computer 10 will send a computer-ready asynchronous signal on the telephone line to the portable unit 22 indicating when it is ready to receive information. This computer-ready asynchronous signal will be received by the receiver 32 of the portable unit for generating a computer on-line control signal and will cause the transmitter 31 to operate.

The transmitter 31, which will be described in detail, will transmit a signal in accordance with the setting of the room code module 21 to identify the room involved, and will transmit a signal identifying the particular portable unit, to thereby identify the person involved. The transmitter will also transmit signals in accordance with the setting of the switches 36 of the control panel 35. Provisions may also be made for transmitting a check word to which the computer will respond to indicate a proper transmission. When the information is received, the computer will send a signal back to the receiver which can be used to operate an indicator lamp 37 to show that a proper signal has been received. The second indicator lamp can be used to indicate any other desired information to be transmitted from the computer to the portable unit.

Figure 4:
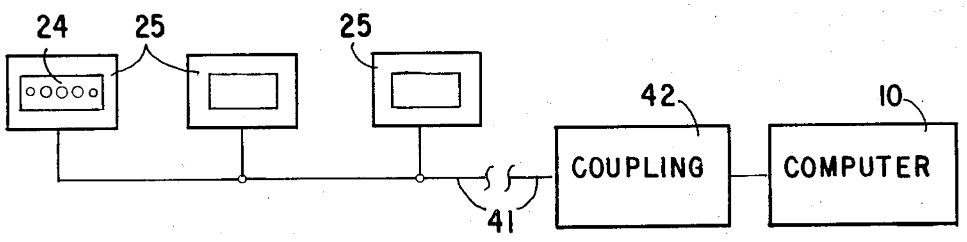
FIG. 4 illustrates the system used with a communication channel such as a television antenna cable.

FIG. 4 shows a system wherein receptacles 25 for a portable unit 24, which may be the same as the receptacle 25 in FIG. 1, are connected by a cable 41 which may be used for applying television signals from a central antenna system to television receivers in the rooms. Any other cable which will carry audio frequency signals can be used, such as the power circuits in a building. The cable 41 is connected through a coupling unit 42 to the computer 1., so that communication can take place between a portable unit 24 in one of the receptacles 25 and the computer 10. Control units, such as the control units 12 and 13 of FIG. 1, can be used with the computer 10 in the system of FIG. 4 for applying information to and receiving information from the computer. A memory for storing information, and a printer for providing a record of information can also be coupled to the computer in FIG. 4, as in FIG. 1.

Figure 5:
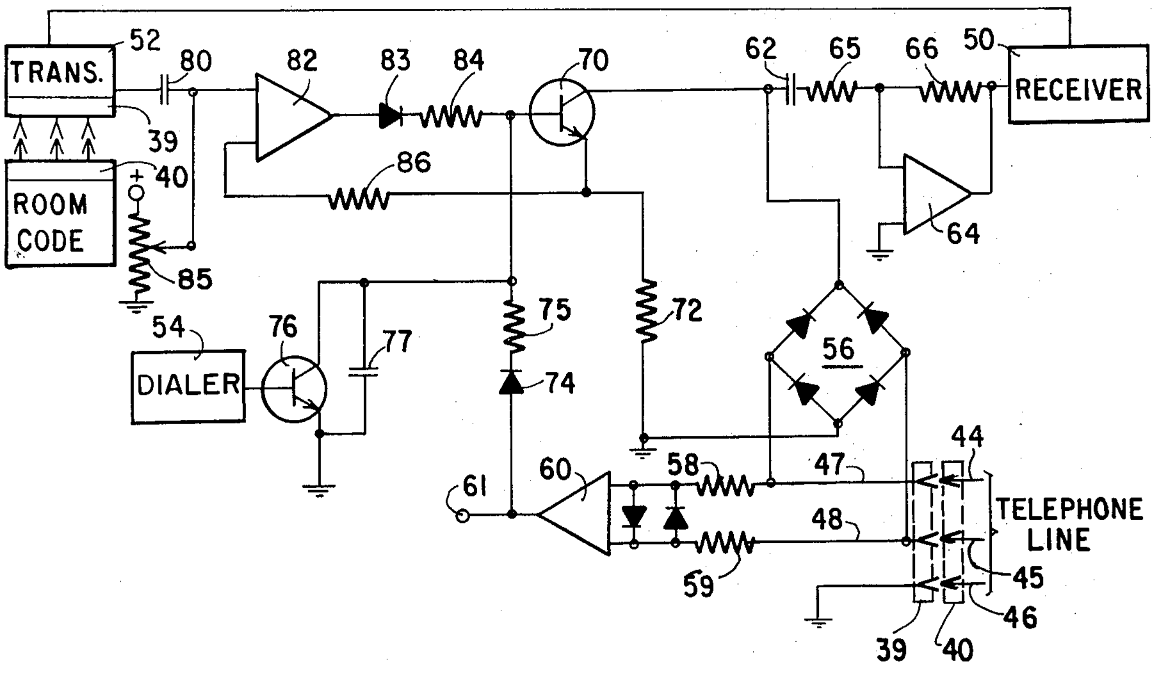
FIG. 5 is a schematic diagram showing the interconnection of the transmitter, receiver and dialer of the portable unit with a telephone line.

FIG. 5 is a schematic diagram of the circuitry of a portable unit 24 which is interconnected with a receptacle 25. The receptacle has conductors 44, 45 and 46 which are connected to the telephone line, and which are connected to the portable unit through the connector 40 of the receptacle and the connector 39 of the portable unit. Conductors 44 and 45 are connected to conductors 47 and 48, respectively, and conductor 46 is connected to the ground of the portable unit.

The portable unit includes a receiver 50, a transmitter 52 and a dialer 54, which are shown in block diagram form in FIG. 5. The transmitter 52 includes a circuit which is connected through the connectors 39 and 40 to a unique coding circuit 53 in the particular receptacle 25 to which it is interconnected to provide a room code for identifying the particular room from which a transmission takes place.

The telephone lines 44 and 45 are connected through conductors 47 and 48 to a diode bridge 56, and through resistors 58 and 59 to operational amplifier 60. The circuit including transistor 70 and resistor 72 is connected across the opposite terminals of the bridge 56. Normally the telephone line 44 is positive and the line 45 is negative, with the open circuit voltage being about 50 volts. The positive potential on line 44, applied through resistor 58 to amplifier 60, renders the amplifier conducting to provide a positive output. This is applied through diode 74 and resistor 75 to the base of transistor 70 and acts to render this transistor conducting.

Transistor 76 connects the base of transistor 70 to ground, and is normally on to hold transistor 70 cut off, so that the bridge 56 applies an open circuit to the telephone line. When a pushbutton on the portable unit 24 is operated to transmit information, the dialer 54 is rendered operative and applies a potential to the base of transistor 76 to turn off this transistor. This removes the ground at the base of transistor 70, to turn this transistor on. This shorts the bridge 56 through resistor 72, to essentially short the lines 47 and 48. The dialer then applies dial pulses which momentarily render transistor 76 conducting. This, in turn, causes transistor 70 to turn off to remove the short across the telephone lines. This operates in the manner of a normal telephone dial to apply pulsing action to the telephone lines.

If the telephone line to the computer is available, the telephone system will respond by reversing the polarity of lines 44 and 45. The amplifier 60 provides a negative output when the potentials on the telephone lines change so that line 45 has a positive potential and line 44 has a negative potential. This negative output is blocked by diode 74 so that it is not applied to the base of transistor 70. An output terminal 61 is shown connected to amplifier 60, which provides a potential indicating when lines 44 and 45 are in the transmitting and receiving condition, which may be used in the operation of the receiver or transmitter.

If the computer is in condition to receive information, a signal will be applied therefrom over lines 44 and 45 to the receptacle 25 and to the portable unit 24. The signal is applied to the diode bridge 56 and through blocking condensor 62 to operational amplifier 64 coupled to the receiver 50. The gain of the amplifier 64 is controlled by the relative values of resistors 65 and 66.

The operational amplifier 64, as well as operational amplifiers 60 and 62, may be of known construction and may be integrated circuit operational amplifiers currently sold by Motorola, Inc. as type MC 1458.

When the receiver 50 receives an asynchronous go-ahead computer on-line control signal, it actuates transmitter 52 to apply frequency shift signals through capacitor 80 to operational amplifier 82. The output of amplifier 82 is applied through diode 83 and resistor 84 to control the conductivity of transistor 70. Voltage divider 85 provides a fixed potential to the operational amplifier to control transistor 70 to provide a constant current therethrough. This is applied to the diode bridge 56 to apply a constant current to the telephone lines of about 30 milliamps. The signal from the transmitter 52 modulates this current to provide an information signal on the telephone line. Resistor 86 completes a feedback path for the operational amplifier from the emitter of transistor 70. Resistor 84 and capacitor 77 suppress oscillations which might occur in the circuit. Diode 83 blocks the positive potential from amplifier 60 which appears during the dialing mode so that it is not applied to the output of the operational amplifier 82.

When a portable unit 24 is used, it need only be placed in a receptacle 25, and one of the switches 36 operated, and the system operates automatically to apply information to the computer. The dialer 54 (FIG. 5) operates to dial the number to convert the calling line to the computer. The transmitter and receiver operate in the manner described in connection with FIG. 2.

Figure 6:
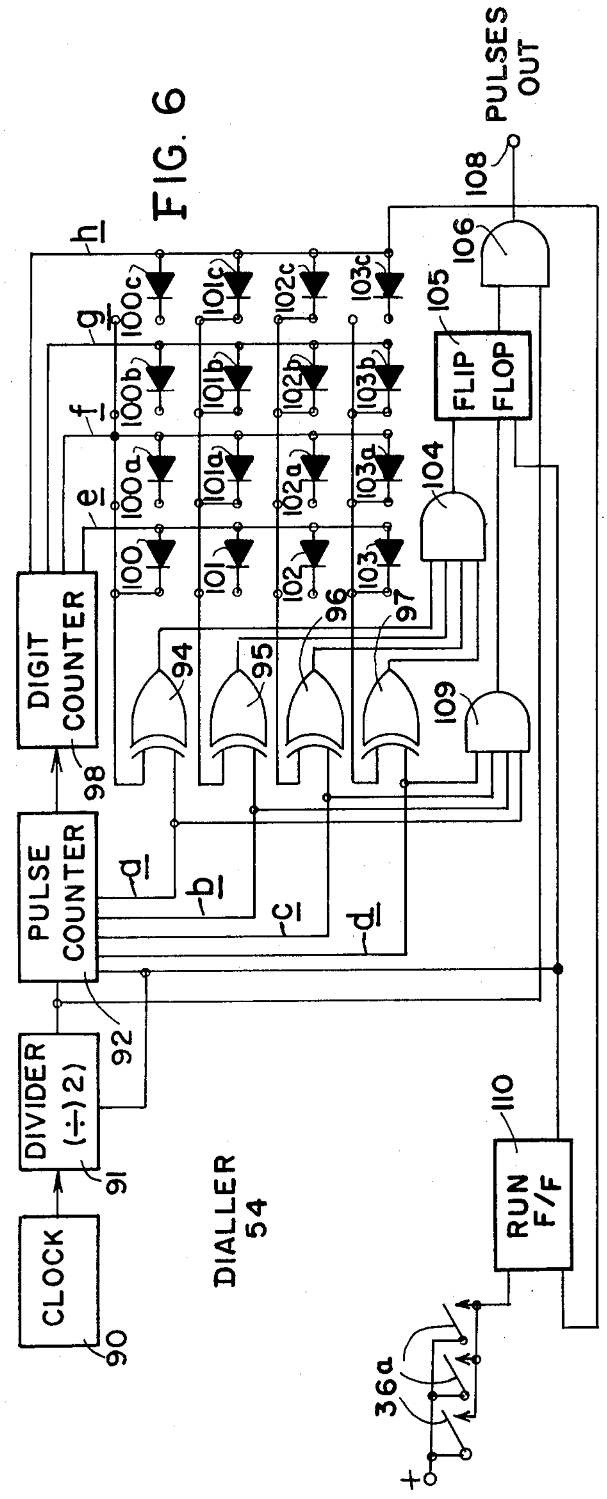
FIG. 6 is a schematic diagram of the dialer of the system of FIG. 5.

In FIG. 6 a schematic diagram of the dialer is shown. The dialer includes a clock 90 which produces pulses having a repetition rate of 20 pulses per second. This is applied to a divider 91 which divides the rate by two to provide a pulse train having 10 pulses per second. The output of the divider 91 is applied to pulse counter 92. This is a four stage binary counter having outputs *a, b, c,* and *d,* which are applied to EXCLUSIVE OR gates 94, 95, 96 and 97, respectively. The pulse counter 92 also triggers a digit counter 98 so that its outputs *e, f, g* and *h* are energized in turn after each complete count of the pulse counters. Each of the outputs of the digit counter 98 is connected to four diodes 100, 101, 102 and 103 which are connected to a second input of the EXCLUSIVE OR gates 94, 95, 96 and 97, respectively. The connections between the diodes 101 to 103 and the inputs to the EXCLUSIVE OR gates are selectively made in accordance with a particular number to be dialed.

The connections from the digit counter output *e* are for the first digit of the telephone or code number. The connections from the output *f* are for the second digit of the number, and so forth. In FIG. 6 a connection is shown AND gate gate 106 will be disabled so that further pulses will not be applied. from output *e* through diode 100 and diode 103 to the inputs of EXCLUSIVE OR gates 94 and 97. The connections from diodes 101 and 102 are open, so that the first digit is the 1001 binary number. Accordingly, when the pulse counter counts to the 1001 binary number, each of the gates 94, 95, 96 and 97 will have two like inputs to produce an output, and these outputs are coupled to the AND gate 104. This will cause the AND gate 104 to produce an output to set the flip-flop 105 so that it applies a disabling signal to AND gate 106. The second input to AND gate 106 is the output of the divider 91, so that the pulses from the divider will be applied to the output 108 as long as the flip-flop is in the reset position. However, when the flip-flop is set, the AND gate 106 will be disabled so that further pulses will not be applied.

The outputs *a, b, c* and *d* of pulse counter 92 are also applied to AND gate 109 to operate the same at the end of the count. This applies an output to the reset input of flip-flop 105 to reset the same at the end of each digit. Accordingly, when the pulses for the next digit start, the flip-flop 105 will be reset to allow the pulses to be applied to the AND gate 106 and the output 108. When the EXCLUSIVE OR gates 94, 95, 96, 97 all provide outputs in response to the same signal being applied to both inputs thereof, the AND gate 104 will operate to set the flip-flop 105 to terminate the pulses.

The diodes 101*a* and 103*a* connected to the digit counter output *f* are connected to the EXCLUSIVE OR gates 95 and 97, and the diodes 100*a* and 102*a* are not connected, so that the second digit will be a 0101 binary number. For the third digit, all the diodes connected to the output are connected to the gates except diode 100*b*, so that the third diode will be the binary number 0111. For the fourth digit the diodes 101*c* and 102*c* connected to output *h* are connected to the gates to produce the binary number 0110.

The pulser is initiated by operation of one of the pushbuttons 36 in the portable unit, which has a contact 36*a* operated thereby. The contacts 36*a* can all be connected in parallel, as operation of any pushbutton starts the dialing operation. This applies a potential to the run flip-flop 110 to start the operation of the pulser. This acts to release the divider 91 and the pulse counter 92, which have previously been latched by the connection from flip-flop 110. When the last digit is transmitted, the connection from the *h* output of digit counter 98 to the run flip-flop 110 will reset the same. This will reset the pulse output flip-flop 105 as well as restore the latch to the divider 91 and pulse counter 92.

Figure 7:
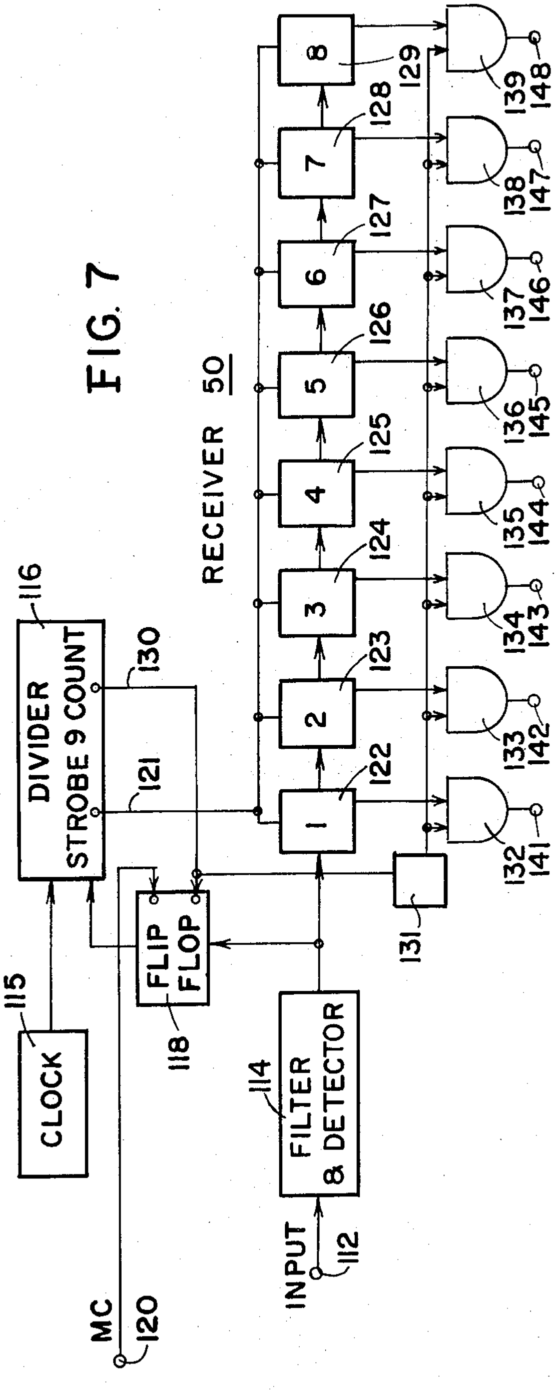
FIG. 7 is a schematic diagram of a receiver for use in the system of FIG. 2 or FIG. 5.

The receiver of the portable unit, identified as 32 in FIG. 2, and as 50 in FIG. 5, is shown in FIG. 7. The input 112 (FIG. 7) receives the output of the operational amplifier 64 of FIG. 5. This is applied to a filter and detector unit 114 which selects and detects the desired signals. The signal which is received on the telephone line is a 9 bit word including a start bit and 8 information bits. A clock 115, which may have a frequency of about 4 kilocycles, applies pulses to divider 116. The divider is activated by signals from the flip-flop 118, which is set by the start pulse from the unit 114.

At the time that the portable unit 24 is plugged into a receptacle 25, the interconnection therebetween provides a master clear pulse which is applied from terminal 120 to the flip-flop 118 to reset the same. The flip-flop 118 is then set by the start pulse and activates the divider to divide the clock pulses. The clock 115 is continuously operating so the counting starts as soon as the divider is activated by flip-flop 118. The divider provides a strobe output on line 121 which corresponds to the bit rate of the received signal. This is applied to the shift register stages 122 to 129.

The shift register stages 122 to 129 are stepped by the pulses which continue until nine shifts have taken place. This will cause the first or start pulse to be shifted completely through the shift register, and the remaining eight information pulses to be stored in the eight stages 122 to 129, respectively. Each of the shift register stages 122 to 129 is connected to one input of AND gates 132 to 139, respectively. On the ninth count, a voltage will be provided at output 130 of the divider 116, and this is applied through coupling circuit 131 to the strobe inputs of all the AND gates 132 to 139. The coupling element may apply the ninth count voltage to the AND gates 132 to 139 so that any AND gate which has a signal applied to its other input will produce an output at its output terminal, 141 to 148, respectively. The coupling unit 131 may be an AND gate requiring a second input in order to apply the strobe input to the output stages 132 to 139. This second input may be applied from terminal 61 at the output of amplifier 60, in FIG. 5. In such case, the AND gates will be operated only when the telephone line has potentials thereon indicating that a signal is being received.

The outputs at the output terminals 141 to 148 may be used to indicate that the computer is ready to receive information, or any other information which may be applied to the telephone line. This may be indicated by selective operation of the lights 37 on the portable unit, or in some other way. One output or computer online control signal is used to start the transmitter when the computer sends a signal indicating that it is in condition to receive information. The outputs 141 to 148 may be used individually to provide an indication or control, or may be used in various combinations, as is desired in a particular application.

Figure 8:
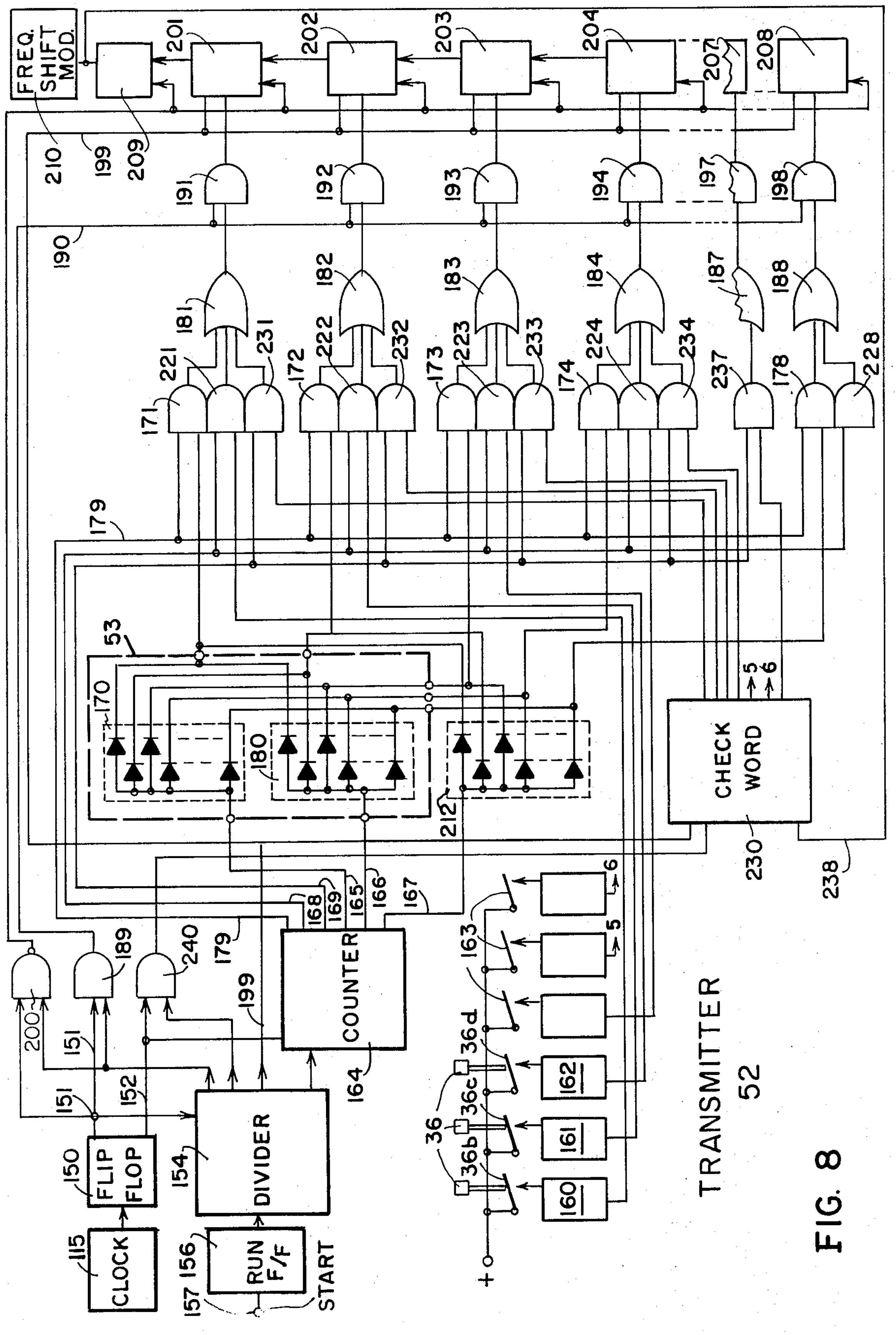
FIG. 8 is a schematic diagram of a transmitter for use in the system of FIG. 2 or FIG. 5.

Considering now the transmitter, which is shown in FIG. 8, this can be used as the transmitter 31 in FIG. 2, and the transmitter 52 in FIG. 5. At the time when it is desired to send information from a portable unit to the computer, one of the pushbuttons 36 will be operated. Each of the pushbuttons operates a switch **36*b*, 36*c* or 36*d* which is shown in FIG. 8. These switches provide potentials to set flip-flops 160, 161 and 162, as will be described. When the transmitter is used in the system of FIG. 5, instead of having separate contacts for initiating operation of the dialer and for setting the flip-flops 160 to 162, a circuit can be connected to the switches 36*b*, 36*c* and 36*d* to start the dialer when any one of these switches is operated. FIG. 8 shows additional switches 163** which can be used to apply additional information inputs, if more than three inputs are desired. The system to be described can be used to handle as many as eight different input bits, and these bits can be used singly and in combination, if such a large number of information inputs is desired.

The transmitter 52 of the portable unit, shown in FIG. 8 may use the same clock 115 which is used by the receiver 50, which is shown in FIG. 7. Accordingly, the duplication of the clock 115 in FIGS. 7 and 8 is merely to render each figure complete. The output of clock 115 is applied to flip-flop 150 which has two outputs, with alternate odd pulses being present at output 151, and even pulses at output 152. The odd pulses are applied to divider 154, which includes stages for producing a sixteen to one division. The divider is selectively activated by run flip-flop 156, which in turn is controlled by the receiver 50. As previously stated, the computer will apply a signal to the receiver to indicate that the computer is in condition to receive information. This signal may provide an output at terminal 141 in FIG. 7. Terminal 141 of the receiver is connected to terminal 157 of the transmitter to activate the run flip-flop 156.

One output of divider 154 is applied to counter 164. This counter has five outputs 165, 166, 167, 168 and 169 which are operative in turn to cause the transmitter to transmit four information words and one check word. The counter 164 also has a sixth output 179 which is operative during the first three words. When the output 165 is energized, this completes the circuit to eight diodes 170 which are individually connected to AND gates 171 to 178. To simplify the drawing, only five diodes are shown, and only five AND gates are shown, which are numbered 171 to 174 and 178. These are referred to as AND gates 171 to 178, even though gates 175, 176 and 177 are not shown. The AND gates 171 to 178 are held operative by the pulse on conductor 179 which extends thereto from the counter 154. The diodes of the group 170 may be selectively connected to the gates 171 to 178 to provide the desired code for the first word. That is, some of the diodes will be connected to the AND gates and some will not, with the connected diodes providing simultaneous inputs to the AND gates so that a ONE output will be produced therefrom. The AND gates to which no diode is connected will produce a ZERO output.

The binary outputs from the AND gates 171 to 178 will be applied to the OR gates 181 to 188. The OR gates are each connected to one input of a second set of AND gates 191 to 198 which have a second input thereof provided by AND gate 189 and coupled to the AND gates 191 to 198 through conductor 190. The AND gate 189 is controlled by inputs from the flip-flop 150 and divider 154 to provide a properly timed load pulse to the AND gates 191 to 198 so that the signals from the associated OR gates are loaded in the shift register stages 201 to 208, respectively. The pulse applied from divider 154 to gate 189 will follow the pulse applied from the divider to counter 164, with the pulse to the counter being at time $t_4$ and the pulse to gate 189 at time $t_6$, for example. Accordingly, the pulses on lines 165 and 179 from the counter will set up the code, and then this code is loaded into the shift register stages.

After the binary outputs are loaded in the shift register stages 201 to 208 to form a word, pulses are applied thereto from the clock AND gate 200, which is controlled by inputs from flip-flop 150 and divider 154 to step out the binary bits serially to the frequency shift modulator 210. A ninth shift register stage 209 is connected between the first stage 201 and the frequency shift modulator 210 to provide a start pulse which precedes the eight information bits. Clock pulses are applied from gate 200 at all times except the time ($t_6$) when the pulses are loaded into the stages 201 to 208. The stages 201 to 208 are held reset by the pulses applied thereto from divider 154 on line 199, except during the time pulses are stepped therethrough.

The signal produced by the modulator 210 shifts between two audio frequencies to transmit the information bits. For example, the signal can shift between frequencies of 2,025 and 2,225 hertz. This signal has the same form as the signal which is received by the portable unit from the computer, as has been described in connection with the receiver of FIG. 7. However, different frequencies will be used, with frequencies of 1,070 and 1,270 hertz being used for signals from the computer to the portable unit.

A second diode group 180 is connected to output 166 of counter 164, with the diodes being connected in parallel with the diodes of group 170 to the AND gates 171 to 178. The diodes 180 are selectively connected to the AND gates to provide the desired code for the second word. That is, a gate connected to a diode provides a binary ONE, and a gate to which no diode is connected produces a binary ZERO. The binary word corresponding to the connections of the diode group 180 is transmitted in the same manner as the first word, which is produced by the diode group 170.

In the system of FIG. 5, the diode groups 170 and 180 are provided by the room code module 53 which is located in the receptacle 25, rather than in the portable unit 24, and the code for the two words identifies the room in which the receptacle is located. By use of two 8 bit words, 65,535 codes can be provided to thereby identify up to 65,535 rooms or locations. It will be noted that two input terminals are required for the two diode groups and eight output terminals, one for each diode. This requires a total of 10 connections which are provided by the connectors 35 and 36 (FIGS. 1 and 2). Accordingly, the first and second word groups are controlled by the connection of the diodes in the receptacle and are transmitted when a portable unit is connected thereto, and a pushbutton is operated to transmit information.

In the system of FIG. 2, the diode groups 170 and 180 can be provided on a plug in card which can be inserted in the portable unit 22. In such case, the card can be provided in the room and attached to the telephone so that when the portable unit is positioned adjacent the telephone, and the telephone handset is positioned on the acoustic coupler, the card can be inserted in the unit 22. The diode groups 170 and 180 are then connected by 10 contacts to the transmitter and operate as has been described.

After the first two words are transmitted, the output 167 of the counter connects the diode group 212 which provides the third word. The diodes in this group are also connected in parallel with the outputs of diode groups 170 and 180, to AND gates 171 to 178. Again the diodes are selectively connected to provide a particular code for the third word. The diodes of group 212 are provided within the portable unit and identify a particular portable unit, or the person who carries it. For example, if the system is used in a hotel, each maid who is on duty will carry one of the portable units, and when a signal is transmitted from this unit, this will identify a particular maid. Again the code will cause certain of the shift register stages to be set, and the pulses will be read out serially to provide the third word.

After the three words have been transmitted, the counter 164 will produce an output on line 168, which applies a potential to AND gates 221 to 228. A second input is selectively applied to AND gates 221 to 223 from the flip-flops 160, 161, 162 connected to the pushbuttons 36 of the portable unit. Accordingly, when the output is present on line 168, the AND gate 221 to 223 which is connected to an operated pushbutton will apply an output to the corresponding OR gate 181, 182 or 183. This will apply a potential to AND gate 191, 192 or 193, and when the second load input is applied thereto from AND gate 189, the shift register will be loaded with information produced by the setting of switches 36 on the portable unit. In a simple system, only one switch will be operated at a time and there will be an output from only one of the gates 191, 192 and 193. Accordingly, there will be just one ONE bit stored in the shift register, with all of the other bits being ZERO.

As only three pushbuttons 36 are shown on the portable units, only three flip-flops 160, 161 and 162 can be operated. Three additional switches 163 are shown connected to flip-flops, and can be used for three more information bits. As previously staed, it is possible in the system shown to provide as many as eight inputs for 8 information bits, and these can be produced in combination so that there will be more than one binary ONE in the word produced. In a system as described for use by a maid in a hotel, the first button 36 can be operated to indicate that the maid is in the room and has started to clean. The second button can be operated by the maid when a room is cleaned. The third button can be operated by a supervisor to show that the room has been checked and is in condition to be rented. The portable units can be carried by other personnel, such as maintenance men, and the buttons can be operated to show when the person is in the room, and when the maintenance is completed. The person involved will be identified by the third word of the signal.

After transmission of the fourth word, which has information as to the setting of the switches 36 on the portable unit, a check word generator 230 is operated. The bits for the four preceding binary words are applied by conductor 238 to the check word generator 230. Also, an output from AND gate 240 is applied to the check word generator as well as the output 199 from divider 154. Generator 230 produces a check word which has 7 bits, and these are applied to AND gates 231 to 237. The output on conductor 169 from counter 164 is also applied to the AND gates 231 to 237, and when both inputs apply pulses to a gate, a ONE output is produced thereby. These outputs are applied through the OR gates 181 to 187 and AND gates 191 to 197 to the shift register stages 201 to 207, as has been described. Accordingly, a binary check word will be transmitted following the four binary information words. The operation of check word generator is as described in an article entitled "Cyclic Codes for Error Detection" by W.W. Peterson and D.T. Brown in the Proceedings of the IRE for January, 1961, pages 228–235.

Figure 9:
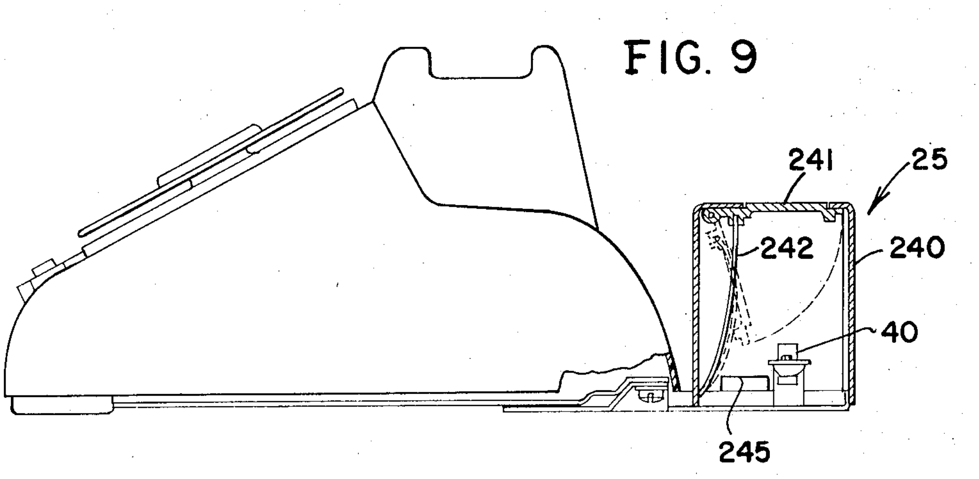
FIGS. 9, 10 and 11 illustrate the construction of the portable unit and the receptacle.
Figure 10:
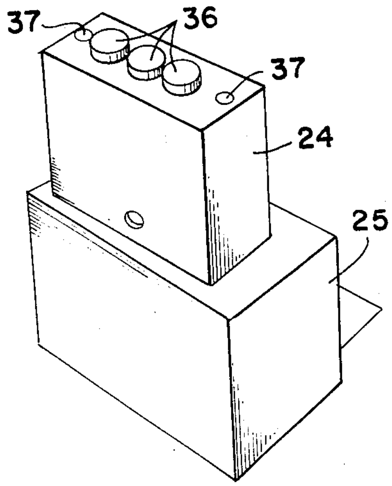

FIG. 9 illustrates the receptacle 25 attached to the rear of a telephone subset. This includes a housing 240 having a door 241 closing and opening at the top. A spring 242 acts to hold the door closed. A portable unit 24 can be pushed against the door to open the same and then inserted to the position wherein the connector 39 on the portable unit is coupled to the connector 40 on the receptacle. FIG. 10 shows the portable unit 24 in operative position in the receptacle 25.

Figure 11:
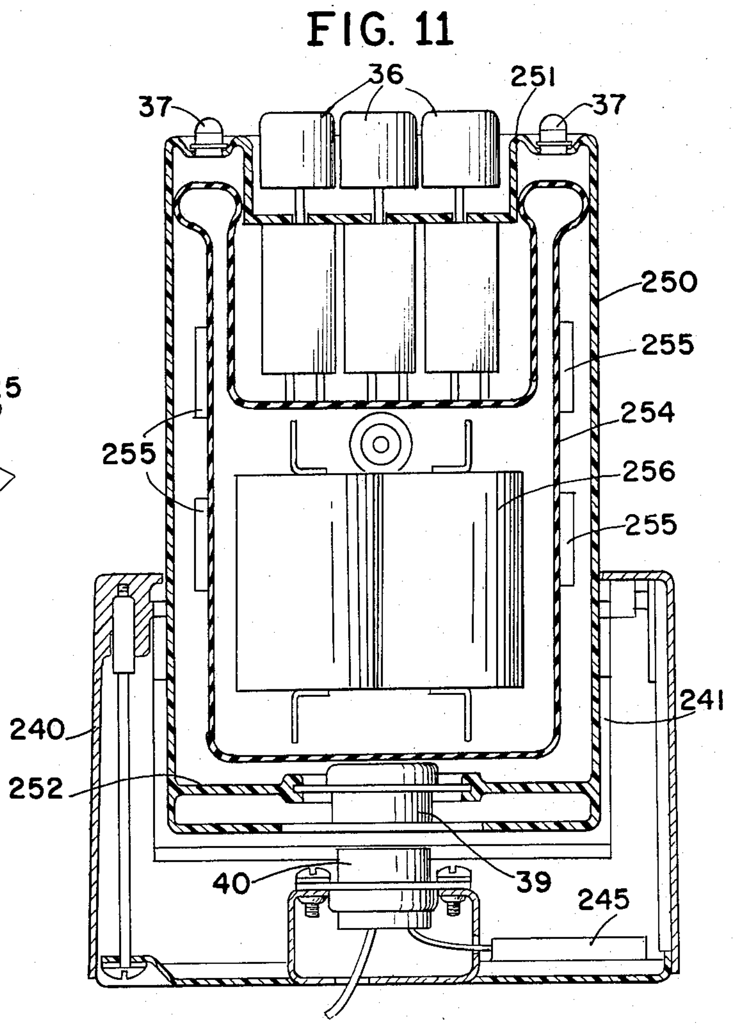

FIG. 11 is a cross-sectional view through the portable unit and the receptacle, with the portable unit just above the position in which it is connected to the receptacle. That is, the connectors 39 and 40 are shown disengaged to better illustrate the structure. The connectors 39 and 40 can be of any known construction. As previously stated, connections will be made from the connector 40 to the telephone line, and also to a circuit board 245 on which the diode groups 170 and 180 are placed.

The portable unit includes a housing 250 having a top control panel 251 which supports the pushbutton switches 36 and the lights 37. The bottom 252 of the housing supports the connector 39. A flexible circuit board 254 is positioned within the housing and has portions adjacent to the switches 36 and to the connector 39, to facilitate electrical connections thereto. Integrated circuit chips 255 are positioned on the flexible circuit board and connected to the circuit thereon. These provide the receiver, transmitter, dialer and the clock which is coupled to both the transmitter and the receiver, as has been described. Batteries 256 are provided within the portable unit to supply the energizing electrical power thereto. In some applications, the power may be applied through the connectors 39 and 40 from a supply which is available at the receptacles. However, the power required is very small, and it is quite practical to use self-contained batteries.

The portable unit 24 may be constructed of a size so that it can be easily carried by the person using the same. Units have been constructed with a housing which has a width of about 3 inches, a length of 4½ to 5 inches and a thickness of about 1 inch. These dimensions are only representative and a unit could be constructed which is somewhat smaller than the dimensions stated.

I claim:

1. Apparatus for providing communication between a plurality of points and a central station, and wherein a communication channel extends from the points to the central station, such apparatus including in combination, a plurality of portable units each including switch means, connector means, and transmitter circuit means connected to said switch means and to said connector means, said transmitter circuit means including means producing a binary signal representing the operation of said switch means of said portable unit, and code means connected to said transmitter circuit means and cooperating therewith to produce a binary signal representing the particular portable unit, a plurality of receptacles at said points and each having terminal means adapted to be connected to the communication channel, connector means for mating with said connector means of said portable unit and circuit means connected to said connector means and to said terminal means, wherein said circuit means includes code means connected to said transmitter circuit means through said connector means to provide a further binary signal for identifying the particular receptacle, each of said portable units cooperating with one of said receptacles upon interengagement of said connector means thereof to apply to said terminal means a binary signal from said transmitter circuit means, and receiver circuit means included in each of the said portable units, for receiving signals from the central station, operatively connected to cause each of said portable units to apply to said terminal means a binary signal from the said transmitter circuit means, in response to a signal from the central station.

2. Apparatus in accordance with claim 1 wherein said portable unit includes clock means and said transmitter circuit means include gating means coupled to said clock means to produce the binary signals.

3. Apparatus for providing communication between a plurality of points and a computer located at a central station, and wherein telephone lines extend from the points to the computer, such apparatus including in combination, a portable unit including transmitter means, receiver means, and switch means coupled to said transmitter means, and further including interface circuit means connecting said receiver means and said transmitter means to the telephone line which includes a diode bridge having a first pair of terminals coupled to the telephone line and a second pair of terminals, and a circuit connected across said second pair of terminals including a transistor and means selectively rendering said transistor conducting in accordance with the potential on the telephone line, coding circuit means selectively connected to said transmitter means and providing a unique code associated with the point at which said portable unit is coupled to the telephone lines, said transmitter means of said portable unit cooperating with said coding circuit means to apply to the communication channel a signal having a first portion representing the unique code of said coding circuit means, and a second portion representing the operation of said switch means of said portable unit.

4. Apparatus in accordance with claim 3 wherein said portable unit includes dial circuit means connected to said transistor for selectively rendering the same conducting to apply dial pulses to the telephone line.

5. Apparatus in accordance with claim 3 including means connecting said transmitter means to said transistor for controlling the conductivity thereof to thereby control the impedance applied through said diode bridge to the telephone line.

6. Apparatus for providing communication between a plurality of points and a central station, and wherein a communication channel extends from the points to the central station, such apparatus including in combination, a plurality of portable units each including switch means, connector means, transmitter circuit means connected to said switch means and to said connector means, said transmitter circuit means including means producing a binary signal representing the operation of said switch means of said portable unit, each portable unit further including receiver circuit means and inter-face means connecting said receiver circuit means and said transmitter circuit means to said connector means of said portable unit, a plurality of receptacles at said points and each having terminal means adapted to be connected to the communication channel, connector means for mating with said connector means of said portable unit and circuit means connected to said receptacle connector means and to said terminal means, interface means, included in each of said portable units, for connecting said receiver circuit means and said transmitter circuit means to said connector means of said portable unit, said interface circuit means including a diode bridge having a first pair of terminals connected to said connector means of said portable unit for connection through said connector means of said receptacle to said terminal means, and a second pair of terminals connected to said receiver means for applying signals thereto, each of said portable units cooperating with one of said receptacles upon interengagement of said connector means thereof to apply to said terminal means a binary signal from said transmitter circuit means.

7. Apparatus in accordance with claim 6 wherein said interface circuit means further includes a circuit including a transistor connected to said second pair of terminals of said diode bridge, and means for controlling the conductivity of said transistor to thereby control the impedance applied to said terminal means.

8. Apparatus in accordance with claim 7 wherein said transmitter circuit means includes means providing frequency shift signals, and means connecting said frequency shift signals to said transistor for modulating the conduction thereof to thereby modulate the impedance applied to said terminal means.

9. Apparatus in accordance with claim 7 including means coupled to said terminal means and responsive to the potentials thereon derived from the communication channel to provide a control potential of a selected polarity, and means for applying said control potential to said transistor to control the conductivity thereof to selectively apply a short circuit and an open circuit to said terminal means.

10. Apparatus in accordance with claim 9 wherein said portable unit includes dial pulse producing means connected to said transistor to selectively render the same conducting and nonconducting.

11. Apparatus for providing communication between a plurality of separated geographic points to be serviced and a computer located at a central station, and a communication channel extending from the plurality of geographic points to the computer comprising:

a portable unit including a receiver means and a transmitter means, first coding circuit means connected to said transmitter means for providing a first unique code representative of the geographic point at which said portable unit is located, switch means connected to said transmitter means for defining a second unique code and for initiating transmission of said first and second unique codes;

signal translating means for coupling signals from said transmitter means to said computer, and to said receiver means from said computer;

said receiver means being responsive to a computer-ready signal for providing a computer on-line control signal;

said first coding circuit means and said switch means being responsive to said computer on-line control signal for automatically applying said first and second unique codes to said transmitter means for transmission to said computer by means of said communication channel; and said computer-ready signal being initiated in response to manual activation of said switch means for automatically applying said first and second unique codes to said communication channel.

12. Apparatus in accordance with claim 11 wherein the receiver means further comprise clock means and gating means coupled to said clock means to receive the signals from the central station.

13. Apparatus in accordance with claim 12 wherein said receiver means further include detector means coupled to said gating means to detect and shape signals from the computer and to transmit them to the gating means.

14. Apparatus for providing communication between a plurality of separated geographic points to be serviced and a computer located at a central station, and a communication channel extending from the plurality of geographic points to the computer as in claim 11 wherein:

said portable unit includes connector means and said signal translating means comprises a receptacle means located at a geographic point to be serviced; and said receptacle means including terminal means connected to said communication channel, said connector means being adapted for interconnection with said receptacle means.

15. Apparatus for providing communication between a plurality of separated geographic points to be serviced and a computer located at a central station, and a communication channel extending from the plurality of geographic points to the computer as in claim 11 wherein:

said switch means comprises a first and a second section;

said first section comprising a first switch means and said second section comprising a predetermined number of manually responsive switch means for defining said second unique code;

said computer-ready signal being initiated in response to manual activation of said first switch means for automatically applying said first and second unique codes to said communication channel; and said predetermined number of manually responsive switch means of said second section being activated to a first predetermined state prior to manual activation of said first switch means.

16. Apparatus for providing communication between a plurality of separated geographic points to be serviced and a computer located at a central station, and a communication channel extending from the plurality of geographic points to the computer as in claim 15 further comprising:

means for electrically interconnecting said first and second sections; and said second section being responsive to activation of said predetermined number of manually responsive switch means for defining said second unique code and for activating said first section for generating said computer-ready signal.

17. Apparatus for providing communication between a plurality of separated geographic points to be serviced and a computer located at a central station, and a communication channel extending from the plurality of geographic points to the computer as in claim 11 wherein the communication channel comprises telephone lines connected to a plurality of handsets located at each of the plurality of geographic points for communication with the computer and wherein:

said signal translating means comprises acoustic coupler means for coupling signals between said handset and said transmitter and receiver means.

18. Apparatus for providing communication between a plurality of separated geographic points to be serviced and a computer located at a central station, and a communication channel extending from the plurality of separated geographic points to the computer as in claim 17 wherein the communication channel comprises telephone lines connected to a plurality of handsets located at each of the plurality of geographic points for communication with the computer wherein:

said transmitter and receiver means includes means for transmitting and receiving audio-frequencies, respectively.

19. Apparatus in accordance with claim 18e wherein said transmitter and receiver circuit means includes means providing binary signals and frequency shift modulator means for providing audio frequency signals which shift between two audio frequencies.

20. Apparatus in accordance with claim 17 wherein said transmitter means includes gating means and clock means coupled to said first coding circuit means to produce binary signals representing said first unique code for identifying the geographic point of coupling of said portable unit to the telphone lines.

21. Apparatus in accordance with claim 20 wherein said transmitter means further includes frequency shift modulator means coupled to said gating means for receiving said binary signals therefrom, said modulator means being coupled to the telephone line for applying signals thereto.

22. Apparatus for providing communication between a plurality of separated geographic points to be serviced and a computer located at a central station, and a communication channel extending from the geographic points to the computer as in claim 11 wherein:

said portable unit further comprises a second coding circuit means connected to said transmitter means for providing a third unique code, said first coding circuit means, said second coding circuit means, and said switch means being responsive to said computer on-line control signal for automatically applying said first, second, and third unique codes to said transmitter means for transmission to said computer by means of said communication channel; and said computer-ready signal being initiated in response to manual activation of said switch means for automatically applying said first, second, and third unique codes to said communication channel.

23. Apparatus in accordance with claim 22 wherein said transmitter means includes gating means and clock means coupled to said first and second coding circuit means to produce binary signals representing said first and third unique codes.

24. Apparatus in accordance with claim 23 wherein said receiver means further comprise clock means and gating means coupled to said clock means to receive the signals from the central station.

25. Apparatus in accordance with claim 23 wherein said transmitter means further includes frequency shift modulator means coupled to said gating means and receiving said binary signals therefrom.

26. Apparatus in accordance with claim 25 wherein said frequency shift modulator means produces audio frequency signals which shift between two frequencies, and said signal translating means includes an acoustic coupler for coupling such signals to the communication channel.

27. Apparatus in accordance with claim 25 wherein said frequency shift modulator means produces audio frequency signals which shift between two frequencies, and further including means connected to the communication channel for receiving said portable unit which includes said signal translating means and said second coding circuit means.

28. Apparatus in accordance with claim 25 wherein said receiver means further include detector means coupled to said gating means to detect and shape signals from the computer and to transmit them to the gating means.

* * * * *